US012615460B2

(12) United States Patent
Kim et al.

(10) Patent No.: US 12,615,460 B2
(45) Date of Patent: Apr. 28, 2026

(54) METHOD AND APPARATUS FOR DETECTING AND RECOVERING ROGUE ONU

(71) Applicant: ELECTRONICS AND TELECOMMUNICATIONS RESEARCH INSTITUTE, Daejeon (KR)

(72) Inventors: Kwang Ok Kim, Jeonju-si (KR); Kyeong Hwan Doo, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 341 days.

(21) Appl. No.: 18/231,860

(22) Filed: Aug. 9, 2023

(65) Prior Publication Data

US 2024/0196119 A1     Jun. 13, 2024

(30) Foreign Application Priority Data

Dec. 12, 2022     (KR) ........................ 10-2022-0172771

(51) Int. Cl.
*H04Q 11/00*     (2006.01)
*H04L 1/00*     (2006.01)

(52) U.S. Cl.
CPC ....... *H04Q 11/0067* (2013.01); *H04L 1/0076* (2013.01); *H04Q 2011/0081* (2013.01); *H04Q 2011/0083* (2013.01); *H04Q 2011/0086* (2013.01)

(58) Field of Classification Search
CPC .................................................. H04Q 11/0067
See application file for complete search history.

(56) References Cited

U.S. PATENT DOCUMENTS

| | | | |
|---|---|---|---|
| 8,768,163 B2 | 7/2014 | Kim et al. | |
| 9,992,561 B2 | 6/2018 | Chen et al. | |
| 10,986,428 B1 * | 4/2021 | Khotimsky | ........ H04Q 11/0067 |
| 2012/0163808 A1 * | 6/2012 | Kim | ................... H04Q 11/0067 |
| | | | 398/30 |

(Continued)

FOREIGN PATENT DOCUMENTS

| | | |
|---|---|---|
| KR | 10-1472407 B1 | 12/2014 |
| KR | 10-1825688 B1 | 2/2018 |

(Continued)

OTHER PUBLICATIONS

US 9,705,632, Jul. 11, 2017, Huawei Technologies Co., Ltd. (withdrawn)

*Primary Examiner* — Shi K Li
(74) *Attorney, Agent, or Firm* — LRK PATENT LAW FIRM

(57) ABSTRACT

A rogue ONU detection and recovery method in a PON network includes steps of: monitoring upstream signals transmitted from a plurality of ONUs to an OLT to acquire LOS signal information and FEC error information; sensing an operation of the rogue ONU in the PON network on the basis of the LOS signal information and the FEC error information; and deactivating at least one of the plurality of ONUs and recovering the rogue ONU to a normal ONU according to whether or not the operation of the rogue ONU is released.

13 Claims, 6 Drawing Sheets

(56) References Cited

U.S. PATENT DOCUMENTS

| | | | | |
|---|---|---|---|---|
| 2017/0279525 | A1 * | 9/2017 | Qu ...................... | H04B 10/0731 |
| 2022/0123837 | A1 | 4/2022 | Kim et al. | |
| 2023/0224074 | A1 * | 7/2023 | Lefevre ................ | H04L 1/0025 |
| | | | | 398/58 |

FOREIGN PATENT DOCUMENTS

| | | | |
|---|---|---|---|
| KR | 10-2021-0064748 | A | 6/2021 |
| KR | 10-2022-0051598 | A | 4/2022 |

* cited by examiner

<u>200</u>

1

METHOD AND APPARATUS FOR DETECTING AND RECOVERING ROGUE ONU

CROSS-REFERENCE TO RELATED APPLICATION

This application claims priority to Korean Patent Application No. 10-2022-0172771, filed on Dec. 12, 2022, the entire content of which is hereby incorporated by reference.

BACKGROUND

1. Technical Field

The present disclosure relates to a rogue ONU detection and recovery method and apparatus. Specifically, the present disclosure relates to a method of detecting an operation of a rogue ONU that emits abnormal continuous signals in a single PON network and recovering the rogue ONU to a normal ONU.

2. Description of Related Art

The content to be described below merely provides background information related to the present embodiment and does not constitute related art.

A passive optical network (PON) system is an optical communication network in which a plurality of optical network units (ONUs) and an optical line terminal (OLT) are connected in a point-to-multipoint manner through an optical cable.

In a PON network, signals are transmitted in an uplink and downlink asymmetric manner. In the PON network, a downstream signal from an OLT is transmitted to a plurality of ONUs in a broadcasting manner. However, upstream signals transmitted from the plurality of ONUs to the OLT are transmitted using time division multiplexing. Specifically, each ONU transmits an upstream signal only in a determined time section according to upstream bandwidth allocation that is transmitted by the OLT.

When one ONU terminal does not transmit an upstream signal according to the upstream bandwidth allocation in a determined specific time section, a collision with an upstream signal of another ONU terminal occurs and the other ONU terminal cannot normally communicate with the OLT. A rogue ONU refers to an abnormal ONU that continuously transmits an upstream signal without conforming to upstream bandwidth allocation information transmitted by the OLT, to interfere with upstream communication of other normal ONUs.

Since this rogue ONU causes deterioration of a communication service of other normal ONUs present in the PON network, a technology capable of detecting and blocking the occurrence of the rogue ONU in the PON network in real time and recovering the rogue ONU to a normal ONU is required.

SUMMARY

An object of the present disclosure is to provide a rogue ONU detection and recovery method and apparatus for monitoring an upstream signal in a PON network to acquire LOS signal information and FEC error information, and sensing an operation of a rogue ONU in real time in the PON network on the basis of the LOS signal information and the FEC error information.

Another object of the present disclosure is to provide a rogue ONU detection and recovery method and apparatus for switching a deactivated ONU in an initial mode to an operation mode before deactivation using preset ONU setting information in a process of detecting and recovering a rogue ONU.

The problems to be solved by the present invention are not limited to the problems mentioned above, and other problems not mentioned will be clearly understood by those skilled in the art from the following description.

In an aspect of the present disclosure, a rogue ONU detection and recovery method in a PON network is provided. The method includes steps of: monitoring upstream signals transmitted from a plurality of ONUs to an OLT to acquire LOS signal information and FEC error information; sensing an operation of the rogue ONU in the PON network on the basis of the LOS signal information and the FEC error information; and deactivating at least one of the plurality of ONUs and recovering the rogue ONU to a normal ONU according to whether or not the operation of the rogue ONU is released.

In another aspect of the present disclosure, a rogue ONU detection and recovery apparatus is provided. The apparatus includes a memory configured to store one or more instructions; and a processor configured to execute the one or more instructions stored in the memory; wherein the processor executes the one or more instructions to monitor an upstream signals transmitted from a plurality of ONUs to an OLT to acquire LOS signal information and FEC error information; sense an operation of a rogue ONU in a PON network on the basis of the LOS signal information and the FEC error information; and deactivate at least one of the plurality of ONUs and recover the rogue ONU to a normal ONU.

According to an embodiment of the present disclosure, since the operation of the rogue ONU is sensed on the basis of the LOS signal information and the FEC error information acquired by monitoring the upstream signal in the PON network, it is possible to sense whether or not the operation of the rogue ONU occurs in the PON network in real time.

According to another embodiment of the present disclosure, since a deactivated ONU in an initial mode is switched to an operation mode before deactivation using preset ONU setting information, it is possible to rapidly recover the ONU without performing a normal ONU activation process again.

The effects of the present disclosure are not limited to the effects mentioned above, and other effects not mentioned will be clearly understood by those skilled in the art from the description below.

DETAILED DESCRIPTION

Figure 1:
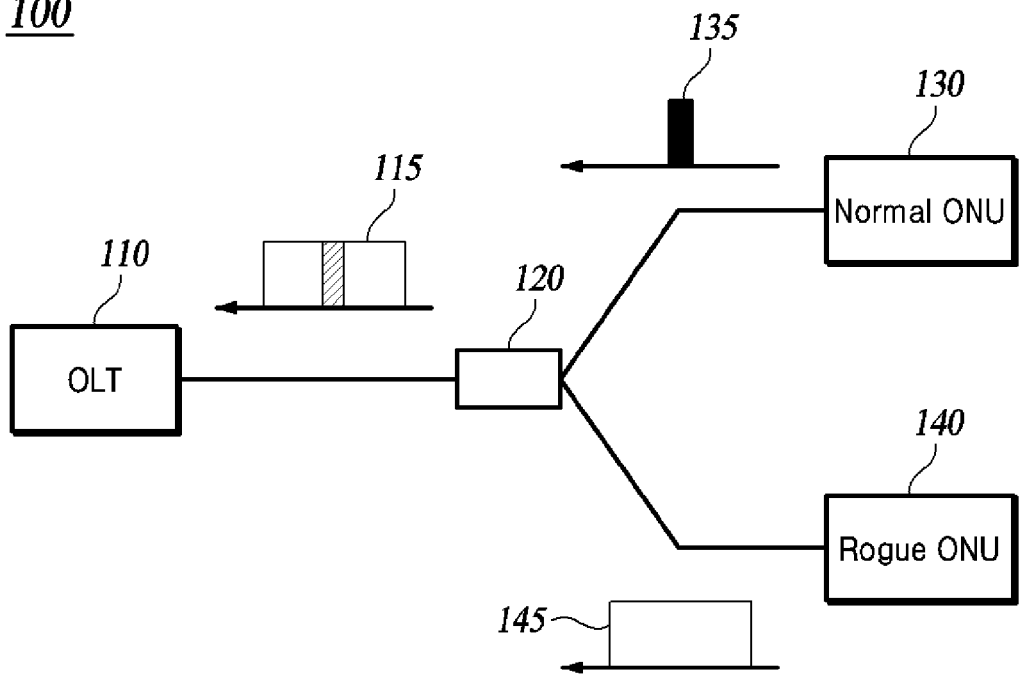
FIG. 1 is a diagram illustrating a case in which an operation of a rogue ONU occurs in a PON network according to the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered obscuring the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

The detailed description set forth below in conjunction with the appended drawings is intended to describe exemplary embodiments of the present disclosure and is not intended to represent the only embodiments in which the present disclosure may be practiced.

FIG. 1 is a diagram illustrating a case in which an operation of a rogue ONU occurs in a PON network according to the present disclosure.

Referring to FIG. 1, in a PON network 100, one optical line terminal (OLT) 110 and a plurality of optical network units (ONUs) 130 and 140 are connected in a point-to-multipoint structure through an optical splitter 120 that branches an optical fiber from the OLT into several optical fibers. Here, each ONU may be connected to at least one PON network subscriber terminal through a user network interface (UNI).

In a downstream (from the OLT to the ONU) of the PON network, an optical signal is transmitted in a broadcasting manner. Specifically, the OLT inserts transmission data and an identifier of an ONU to which the transmission data is to be transmitted into each frame of a downstream and transmits a signal in a broadcasting manner. Thereafter, each ONU detects a frame corresponding to an identifier of the ONU from the downstream signal received from the OLT and receives data.

In an upstream of the PON network (from the ONU to the OLT), an optical signal is transmitted in a burst manner. Specifically, the OLT allocates a band, that is, a time slot for upstream transmission, to each of the plurality of ONUs present in the PON network. Thereafter, the ONU transmits an optical signal to the OLT during each allocated time slot and performs data transmission. Since burst signals are sequentially transmitted using different pre-allocated time slots to the plurality of ONUs, it is possible to prevent optical signal collision between the ONUs in an upstream.

However, when any one of the plurality of ONUs of the PON network 100 operates as a rogue ONU 140 and transmits a continuous optical signal 145, the optical signal collision between the ONUs occurs in the upstream 115.

For example, the normal ONU 130 transmits a first burst signal 135 during a first allocated time slot. Here, the first time slot is set such that only the first burst signal 135 is transmitted to the OLT 110 in a corresponding time section. That is, optical signals are not transmitted from other ONUs in the time period.

However, the rogue ONU 140 transmits the continuous optical signal 145 in all time sections regardless of a time slot allocated to the rogue ONU 140. Therefore, a collision occurs between the continuous optical signal 145 and the first burst signal 135 during a time section corresponding to the first time slot of the upstream 115 in the optical splitter 120.

Since the continuous optical signal 145 is transmitted to the OLT 110 in all the time slots, an error due to collision is generated for time slots of other ONUs (not illustrated) constituting the PON network 100 as well as the first time slot of the normal ONU 130 of the upstream 115. Accordingly, the OLT 110 may detect a loss of signal (LOS) for each ONU. Further, since a signal of the upstream 115 includes a plurality of signal distortions caused by overlapping of different optical signals, a number of serious errors that are not corrected through forward error correction (FEC) occur. Accordingly, the number of FEC uncorrectable errors in the OLT 110 may greatly increase.

When the OLT 110 detects LOS signals for all the ONUs and no FEC uncorrectable error occurs, this is a case that no burst signal is received from any one of the ONUs, and thus, a determination can be made that there is a problem in the PON network 100, such as snapping of an optical cable. When only the LOS signal for a specific one of the ONUs is detected and the FEC uncorrectable error occurs, a determination may be made that power of an optical signal of the specific ONU is lowered below a preset tolerance.

However, when the LOS is detected in all the ONUs and the FEC uncorrectable errors suddenly increase, a determination may be made that a rogue operation has occurred due to continuous optical signal transmission from one of the ONUs. The rogue ONU detection and recovery apparatus according to the embodiment of the present disclosure can sense whether or not the rogue ONU 140 has occurred in the PON network 100 on the basis of the LOS signal and an FEC error detected by the OLT 110.

Figure 2:
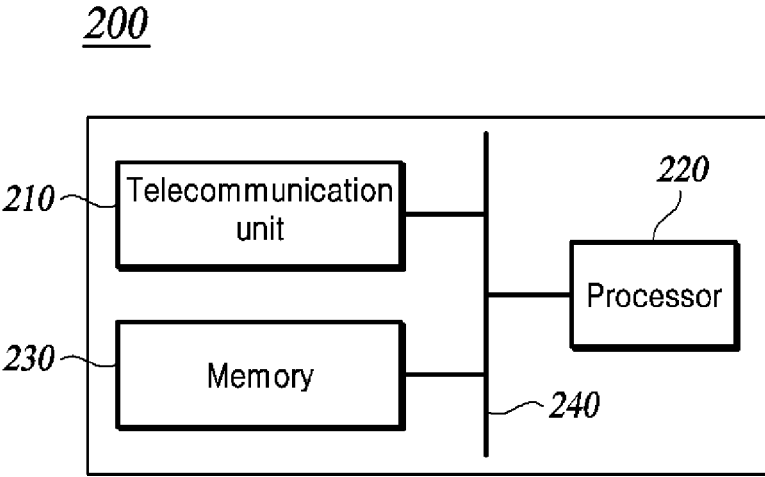
FIG. 2 is a block diagram of a rogue ONU detection and recovery apparatus according to an embodiment of the present disclosure.

FIG. 2 is a block diagram of a rogue ONU detection and recovery apparatus according to an embodiment of the present disclosure.

Referring to FIG. 2, a rogue ONU detection and recovery apparatus 200 according to an embodiment includes all or some of a telecommunication unit 210, a processor 220, and a memory 230. Here, the telecommunication unit 210, the processor 220, and the memory 230 can transmit data to each other through a bus 240.

All blocks illustrated in FIG. 2 are not essential components of the rogue ONU detection and recovery apparatus 200, and some blocks included in the rogue ONU detection and recovery apparatus 200 in another embodiment may be added, changed, or deleted. For example, the rogue ONU detection and recovery apparatus 200 is an apparatus implemented separately from the OLT in the PON network, and may include all or some of all the blocks illustrated in FIG. 2, but may be implemented by an OLT that can perform detection and recovery of the rogue ONU and some blocks illustrated in FIG. 2 may be replaced or changed with blocks constituting a general OLT.

The telecommunication unit 210 may directly receive upstream signals transmitted from the plurality of ONUs to the OLT and transmit the upstream signals to the processor 220. Here, the processor 220 may acquire LOS signal information and FEC error information from the upstream signal.

According to another embodiment, the telecommunication unit 210 may receive the LOS signal information and the FEC error information detected from the upstream signals transmitted from the plurality of ONUs to the OLT, but the present disclosure is not limited thereto. For example, the telecommunication unit 210 may be communicatively connected to a server device for management of an OLT or a PON network outside the device 200 for detecting and recovering a rogue ONU to receive the LOS signal information and the FEC error information. Here, the telecommunication unit 210 may further include a hardware module such as a network interface card, a network interface chip, and a networking interface port, or a software module such as a network device driver or a networking program to establish a communication connection.

The telecommunication unit 210 may be connected to the plurality of ONU devices constituting a PON network and transmit an ONU control message signal generated by the rogue ONU detection and recovery apparatus 200 to the plurality of ONU devices. For example, the telecommunication unit 210 transmits a physical layer operations, administration and maintenance (PLOAM) message for deactivating at least any one or more of the plurality of ONUs, a PLOAM message for switching the ONU in an initial mode to an operation mode, or the like to the plurality of ONUs constituting the PON network.

The processor 220 monitors the upstream signals transmitted from the plurality of ONUs to the OLT to acquire the LOS signal information and the FEC error information. Here, the processor 220 may acquire the LOS signal and the FEC error information by analyzing the upstream signal, but the present disclosure is not limited thereto. For example, the processor 220 may receive the LOS signal information and the FEC error information from a separately configured OLT or PON network management server using the telecommunication unit 210.

The LOS signal information is an LOS signal for at least any one of the plurality of ONUs detected from the upstream signal. Here, the LOS signal is a signal for warning that an optical signal for any one of the ONUs is not included in the upstream signal when such an optical signal is not included in the upstream signal. The upstream signal may include a plurality of burst signal frames corresponding to the plurality of ONUs, and an LOS signal for warning that a signal for a pre-allocated time slot in the plurality of burst signal frames is not received when such a signal is not received is generated.

For example, when the first time slot of the upstream signal is set to an upstream signal transmission time of the first ONU, and a second time slot that is a time section temporally next to the first time slot is set to an upstream signal transmission time of the second ONU, a second LOS signal may be generated when a normal signal of the first ONU is received in the first time slot, but a normal signal of the second ONU is not received in the second time slot.

The LOS signal information may include information on whether or not LOS signals for all the ONUs connected to the OLT are generated. For example, the processor 220 may monitor whether or not an LOS signal is generated for time slots corresponding to N ONUs connected to the OLT in the upstream signal, and acquire LOS signal information indicating whether or not the LOS signal is generated for any one of N ONUs.

The FEC error information is the information on the number of FEC uncorrectable errors generated in the upstream signal. Specifically, the FEC error information is information on the number of errors that cannot be corrected even by using an FEC algorithm among errors generated in data of the upstream signal.

Signal distortion may occur in a process of transmitting the upstream signal, and a data error due to the distortion may be detected and corrected using an FEC algorithm. However, when a degree of data distortion is significant, uncorrectable errors may occur. When the FEC is performed on the data of the upstream signal, information on at least one of the number of errors generated in the data, the number of errors corrected using the FEC, and the number of FEC uncorrectable errors may be acquired. Here, the FEC error information acquired by the processor 220 includes the information on the number of FEC uncorrectable errors. For example, the FEC error information may include information on the number of errors of an FEC uncorrectable error counter.

The processor 220 senses the operation of the rogue ONU in the PON network on the basis of the LOS signal information and the FEC error information.

In the case of an abnormality of an optical cable in the PON network or power-off or malfunction of a specific ONU terminal device, the LOS signal may be generated, but the number of FEC errors does not increase. However, when the LOS signals for all the ONUs are generated and the number of FEC errors increases, any cause of distortion in the transmitted optical signals of all the temporally and spatially isolated ONUs can be evaluated as being continuously present throughout an entire section of the upstream signal in the PON network. Further, such a cause may be expected to be any signal or noise causing significant distortion in the upstream signal, from a sudden increase in the FEC uncorrectable error.

The processor 220 determines whether or not LOS signals are generated for all the ONUs in the PON network on the basis of the LOS signal information. When any one ONU is a rogue ONU in the PON network, an abnormal continuous optical signal transmitted from the rogue ONU collides with burst signals of all the other ONUs. In this case, the LOS signal may be generated for each of all the ONUs. The processor 220 may determine whether or not signals for all the ONUs connected to the OLT are abnormally received, on the basis of the LOS signal information.

The processor 220 determines whether or not the number of FEC uncorrectable errors generated for the upstream signal increases on the basis of the FEC error information.

When the abnormal continuous optical signal transmitted from the rogue ONU collides with the burst signals of all the other ONUs, an FEC error for the upstream signal increases. In particular, since the signal distortion generated while the burst signal overlapping with the continuous optical signal causes serious errors that cannot be corrected by the FEC algorithm, the number of FEC uncorrectable errors increases suddenly. For example, the number of FEC uncorrectable error counters may increase suddenly.

The processor 220 determines that the operation of the rogue ONU has occurred in the PON network when the LOS signals for all the ONUs among the plurality of ONUs are generated and the number of FEC uncorrectable errors increases. Here, the processor 220 may determine that the operation of the rogue ONU has occurred when the number of FEC uncorrectable errors increases to a preset threshold value or more. For example, the processor 220 may determine that the operation of the ONU has occurred when a bit error rate (BER) is lower than $10^{-3}$ due to the increase in the FEC uncorrectable error counter of the OLT.

When the processor 220 determines that the operation of the rogue ONU has occurred in the PON network, the processor 220 deactivates at least one of the plurality of ONUs and recovers the rogue ONU to a normal ONU depending on whether or not the operation of the rogue ONU has been released.

According to an embodiment, the processor 220 may sequentially perform detection and recovery of the rogue ONU on the plurality of ONUs in a unicast manner. The processor 220 deactivates any one of the plurality of ONUs.

The processor 220 transmits a deactivation PLOAM message to any one of the plurality of ONUs connected to the OLT, that is, the ONU under test. The ONU under test that has received the deactivation PLOAM message is switched from the operation mode to the initial mode.

The processor 220 checks whether or not the operation of the rogue ONU is released on the basis of the LOS signal information and the FEC error information in a state in which the ONU under test is deactivated.

When the ONU under test is a rogue ONU, collision with the burst signals of the other ONUs does not occur because the deactivated ONU under test no longer transmits the continuous optical signal. Accordingly, the LOS signal for the ONUs other than the ONU under test is not generated, or the LOS signal is generated only for some of the ONUs. Further, the number of FEC uncorrectable errors no longer increases suddenly. On the other hand, when the ONU under test is not the rogue ONU, any one ONU other than the ONU under test still transmits the continuous optical signal, and thus, the collisions with the burst signals of the other ONUs continue. Therefore, the LOS signal is generated for all the ONUs other than the ONU under test, and the number of FEC uncorrectable errors also increases suddenly.

The processor 220 monitors the upstream signal transmitted to the OLT for a preset time, determines that the operation of the rogue ONU is still not released when the LOS signal is generated for all the ONUs other than the ONU under test among the plurality of ONUs and the number of FEC uncorrectable errors continues to increase, and determines that the operation of the rogue ONU has been released in other cases.

When the operation of the rogue ONU is not released, the processor 220 determines the deactivated ONU under test to be a normal ONU, and switches the ONU under test from the initial mode to the operation mode using pre-stored ONU setting information. Here, the pre-stored ONU setting information may include at least one of ONU identification information, burst signal allocation information, and ONU distance correction value information for the ONU under test, which are stored in advance before inactivation.

The processor 220 generates and transmits the PLOAM message for performing control so that the ONU under test switches to an operation mode using the pre-stored ONU setting information. Here, the PLOAM message may include an Assign ONUID PLOAM message and an Assign EqD PLOAM message. The ONU under test that has received the PLOAM message from the processor 220 is immediately switched to the operation mode before the deactivation without a normal activation process such as identifier assignment or distance measurement.

The processor 220 determines any ONU other than the ONU under test among the plurality of ONUs connected to the OLT to be a new ONU under test, and performs the same process as the above-described processes of deactivating and checking whether or not the operation of the rogue ONU has been released. The processor 220 may sequentially repeat the same process for each of the plurality of ONUs connected to the OLT until the operation of the rogue ONU is released.

When the operation of the rogue ONU is released, the processor 220 determines the ONU under test to be the rogue ONU and performs the activation process on the ONU under test again. Here, the activation process may include a normal process of resetting various setting parameters for the ONU under test determined to be the rogue ONU to transmit an upstream signal to the OLT. For example, the processor 220 may assign a burst signal profile and an identifier in the PON network for the ONU under test in the initial mode again, perform a process of measuring a distance to the ONU under test again to acquire a new setting parameter, and switch the ONU under test to the operation mode on the basis of the setting parameter.

According to another embodiment, the processor 220 may perform detection and recovery of a rogue ONU on the plurality of ONUs in a broadcasting manner. The processor 220 deactivates all of the plurality of ONUs.

The processor 220 transmits the deactivation PLOAM message to all of the plurality of ONUs connected to the OLT. The plurality of ONUs that has received the deactivation PLOAM message are all switched from the operation mode to the initial mode.

The processor 220 checks whether or not the operation of the rogue ONU is released on the basis of the LOS signal information and the FEC error information in a state in which all the ONUs have been deactivated. When not only the normal ONU that has received the deactivation PLOAM message but also the rogue ONU are controlled by the deactivation PLOAM message, no optical signal, as well as the continuous optical signal, is transmitted. Therefore, the number of FEC uncorrectable errors no longer increases.

The processor 220 monitors an upstream signal detected by a reception unit of the OLT for a preset time and determines whether or not the operation of the rogue ONU has been released on the basis of the detected LOS signals and whether or not the number of FEC uncorrectable errors increases. For example, when the FEC uncorrectable error no longer increases, the processor 220 may determine that the operation of the rogue ONU has been released.

When the operation of the rogue ONU is released, the processor 220 sequentially switches the plurality of ONUs to an operation mode using the pre-stored ONU setting information. Here, the pre-stored ONU setting information may include at least one of the ONU identification information, the burst signal allocation information, and the ONU distance correction value information for each of the plurality of ONUs stored in advance before deactivation.

The processor 220 generates and transmits the PLOAM message for performing control so that each of the plurality of ONUs is switched from the initial mode to the operation mode using the pre-stored ONU setting information. Here, the PLOAM message may include an Assign ONUID PLOAM message and an Assign EqD PLOAM message.

The plurality of ONUs that has received the PLOAM message from the processor 220 are sequentially switched to the operation mode before deactivation without a normal activation process such as identifier assignment or distance measurement.

The memory 230 may include a volatile memory, or a permanent, virtual, or other types of memory for storing information that is used by or output by the rogue ONU detection and recovery apparatus 200. For example, the memory 230 may include a random access memory (RAM) or a dynamic RAM (DRAM).

The memory 230 stores basic programs, application programs, network setting information, and the like for an operation of the rogue ONU detection and recovery apparatus 200. The memory 230 may provide the stored information to the processor 220 according to a request from the processor 220.

The memory 230 may store various types of data for processing or control of the processor 220. For example, the memory 230 includes at least one of the LOS signal information, the FEC error information, ONU terminal serial number information for each of the plurality of ONUs connected to the OLT, the ONU identification information, the burst signal allocation information, and the ONU distance correction value information.

Further, the memory 230 may store various types of data generated by the processor 220. For example, the memory 230 may store, for example, the PLOAM message that the processor 220 generates to switch the ONU to the initial mode or the operation mode.

Figure 3:
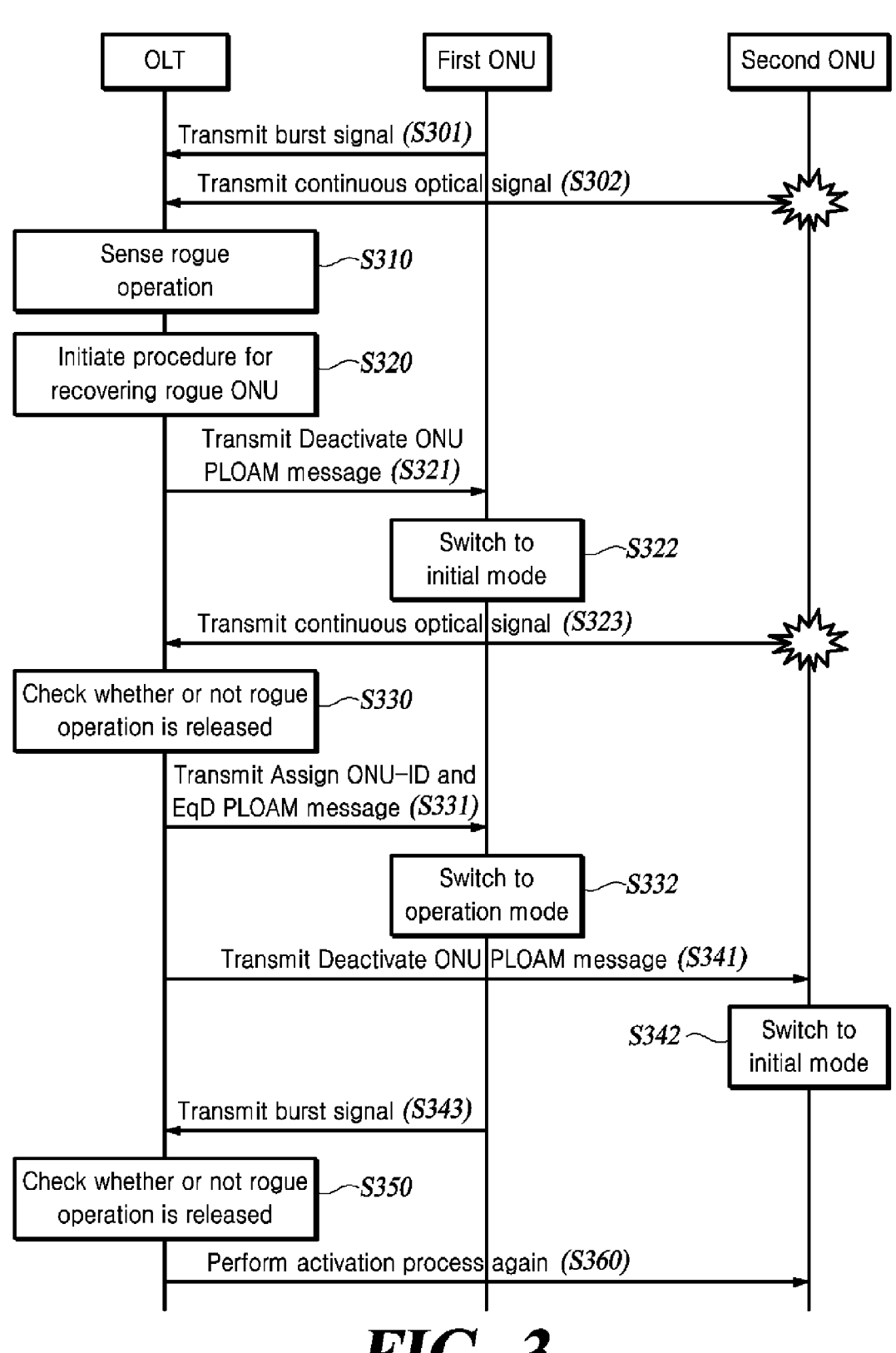
FIG. 3 is a flowchart illustrating a process of detecting and recovering a rogue ONU in the rogue ONU detection and recovery apparatus according to the embodiment of the present disclosure.

FIG. 3 is a flowchart illustrating a process of detecting and recovering a rogue ONU in the rogue ONU detection and recovery apparatus according to the embodiment of the present disclosure.

Referring to FIG. 3, in the first ONU, a normal burst signal is transmitted to the OLT (S301), and in the second ONU, which is a rogue ONU, an abnormal continuous optical signal is transmitted to the OLT (S302). As a result, overlapping and collision between ONU signals occur in the upstream signals in the OLT.

The rogue ONU detection and recovery apparatus senses a rogue operation on the basis of the LOS signal information and the FEC error information for the upstream signal in the OLT for a preset time such as about 1 ms (S310). Here, the rogue ONU detection and recovery apparatus may determine that the operation of the rogue ONU has occurred in the PON network when the LOS signals for the first ONU and the second ONU are both generated and the number of FEC uncorrectable errors increases.

When a determination is made that the operation of the rogue ONU has occurred, the rogue ONU detection and recovery apparatus initiates a procedure for recovering the rogue ONU (S320). The rogue ONU detection and recovery apparatus sequentially performs a check as to whether or not the rogue operation is released, and the ONU recovery procedure for the plurality of ONUs connected to a single PON network, such as the first ONU and the second ONU.

The rogue ONU detection and recovery apparatus first sets the first ONU as an ONU under test, and checks whether or not the first ONU is a rogue ONU. The rogue ONU detection and recovery apparatus controls the OLT so that the OLT transmits a Deactivate ONU PLOAM message to the first ONU (S321), to deregister the first ONU.

When the first ONU receives the Deactivate ONU PLOAM message, the first ONU is switched from the operation mode to the initial mode (S322). Here, the first ONU initializes all of existing setting parameters. That is, the first ONU is switched to the initial state. Since the first ONU is switched to the initial state, the first ONU does not transmit the burst signal to the OLT, and only the continuous optical signal from the second ONU, which is a rogue ONU, is transmitted to the OLT (S323). In other words, an operation of the rogue ONU in the PON network is not released.

The rogue ONU detection and recovery apparatus checks whether or not the rogue operation is released on the basis of the LOS signal information and the FEC error information for the upstream signal in the OLT for a preset time (S330). Since the upstream signal in the OLT still includes the continuous optical signal from the second ONU, the rogue ONU detection and recovery apparatus can determine that the operation of the rogue ONU has not been released.

Since the operation of the rogue ONU is not released even though the first ONU is in a deactivated state, the rogue ONU detection and recovery apparatus may determine that the first ONU is not a rogue ONU. Accordingly, the rogue ONU detection and recovery apparatus controls the OLT so that the OLT transmits the Assign ONU-ID PLOAM message and the Assign EqD PLOAM message to the first ONU (S331). The first ONU that has received the message transmitted from the OLT is immediately switched from the initial mode to the operation mode (S332). Here, the first ONU is rapidly recovered to the operation mode state before deactivation without an initialization process, using the pre-stored ONU setting information.

The rogue ONU detection and recovery apparatus sets the second ONU as an ONU under test, and checks whether or not the second ONU is a rogue ONU. The rogue ONU detection and recovery apparatus controls the OLT so that the OLT transmits the Deactivate ONU PLOAM message to the second ONU (S341) to deregister the second ONU. When the second ONU receives the Deactivate ONU PLOAM message, the second ONU is switched from the operation mode to the initial mode (S342).

Since the second ONU has been switched to an initial state, the second ONU no longer transmits the continuous optical signal, and only a normal burst signal from the first ONU is transmitted to the OLT (S343). That is, the operation of the rogue ONU in the PON network is released.

The rogue ONU detection and recovery apparatus checks whether or not the rogue operation is released on the basis of the LOS signal information and the FEC error information for the upstream signal in the OLT for a preset time (S350).

Since the operation of the rogue ONU is released when the second ONU is in the deactivated state, the rogue ONU detection and recovery apparatus may determine that the previous rogue ONU operation has been caused by the second ONU. Therefore, the rogue ONU detection and recovery apparatus determines the second ONU to be the rogue ONU.

The rogue ONU detection and recovery apparatus performs the activation process on the second ONU again (S360). Specifically, when the activation process is performed again, the identifier and the distance correction value for the second ONU are allocated and calculated again, and the second ONU is re-registered on the basis of the new setting parameters.

The rogue ONU detection and recovery apparatus can determine that a failure occurs and end a service when the second ONU is not registered in a normal operation mode through the activation process, and provide a normal service in the PON network when the second ONU is normally registered through the activation process. As illustrated in FIG. 3, when a rogue ONU operation detection and recovery procedure is performed sequentially on each of the plurality of ONUs in a so-called unicasting manner, it is possible to identify which of the ONUs is the rogue ONU and individually block and recover only the rogue ONU.

Figure 4:
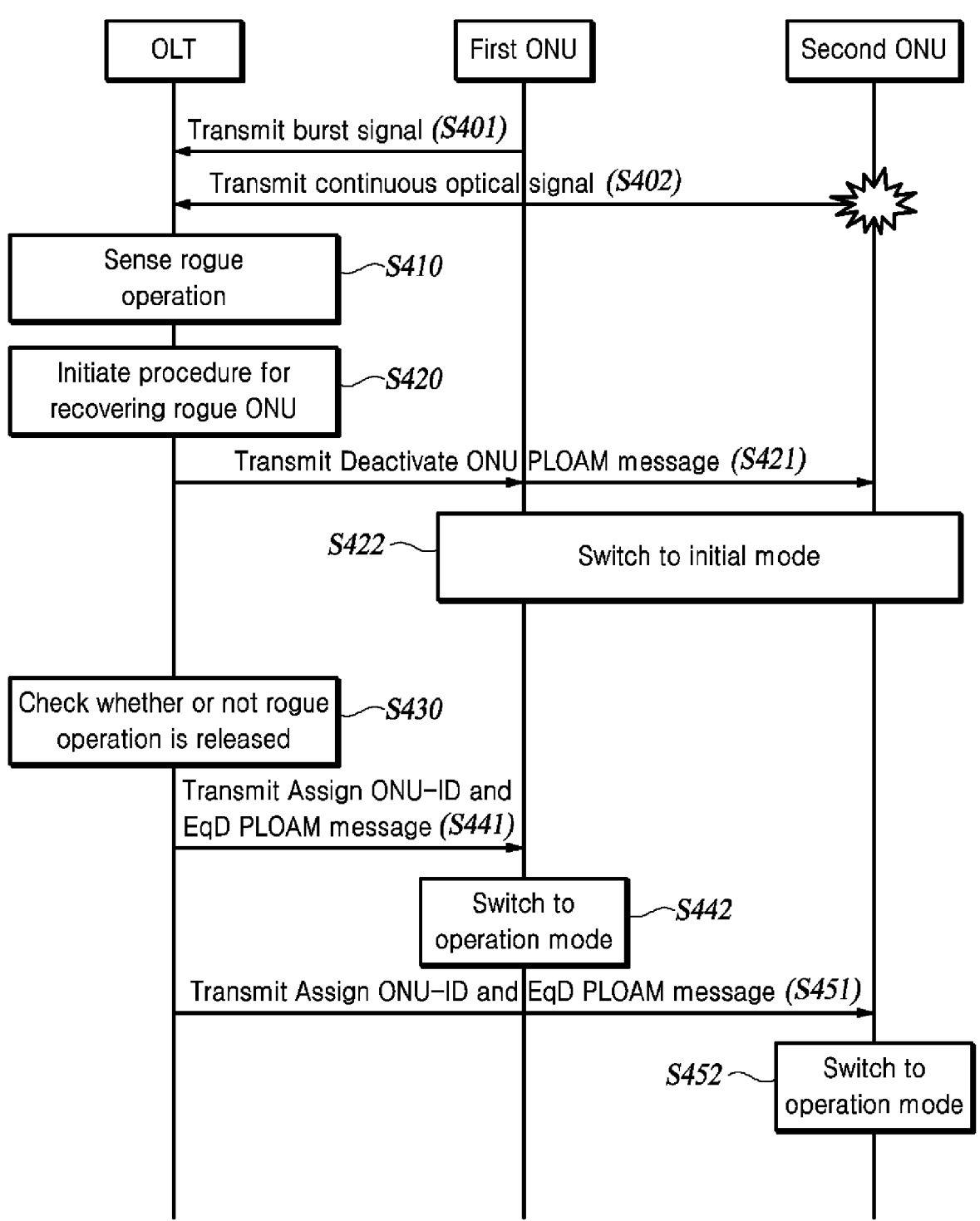
FIG. 4 is a flowchart illustrating a process of detecting and recovering a rogue ONU in a rogue ONU detection and recovery apparatus according to another embodiment of the present disclosure.

FIG. 4 is a flowchart illustrating a process of detecting and recovering a rogue ONU in a rogue ONU detection and recovery apparatus according to another embodiment of the present disclosure.

Referring to FIG. 4, in the first ONU, a normal burst signal is transmitted to the OLT (S401), and in the second ONU that is a rogue ONU, an abnormal continuous optical signal is transmitted to the OLT (S402). As a result, overlapping and collision between ONU signals occur in the upstream signals in the OLT.

The rogue ONU detection and recovery apparatus senses a rogue operation on the basis of the LOS signal information and the FEC error information for the upstream signal in the OLT for a preset time such as about 1 ms (S310). Here, the rogue ONU detection and recovery apparatus may determine that the operation of the rogue ONU has occurred in the PON network when the LOS signals for the first ONU and the second ONU are both generated and the number of FEC uncorrectable errors increases.

When a determination is made that the operation of the rogue ONU has occurred, the rogue ONU detection and recovery apparatus initiates a procedure for recovering the rogue ONU (S420). The rogue ONU detection and recovery apparatus simultaneously deactivates all ONUs connected to a single PON network, such as the first ONU and the second ONU, and then performs check as to whether or not the rogue operation is released, and the ONU recovery procedure.

The rogue ONU detection and recovery apparatus performs control so that the OLT transmits the Deactivate ONU PLOAM message to the first ONU and the second ONU. When the first ONU and the second ONU receive the Deactivate ONU PLOAM message, the first ONU and the second ONU are switched from the operation mode to the initial mode (S422), and parameters set in the ONUs are initialized.

The rogue ONU detection and recovery apparatus checks whether or not the rogue operation is released on the basis of the LOS signal information and the FEC error information for the upstream signal in the OLT for a preset time (S430). When there is no other failure in the second ONU that is a rogue ONU, the second ONU is normally initialized by the Deactivate ONU PLOAM message, and there is no longer continuous optical signal in the upstream signal. Accordingly, the rogue operation by the second ONU is released.

When the rogue operation is released, the rogue ONU detection and recovery apparatus rapidly recovers all the ONUs to the operation mode state prior to deactivation using the pre-stored ONU setting information without performing the initialization process again.

The rogue ONU detection and recovery apparatus controls the OLT so that the OLT transmits the Assign ONU-ID PLOAM message and the Assign EqD PLOAM message to the first ONU (S441). The first ONU that has received the message transmitted from the OLT is immediately switched from the initial mode to the operation mode (S442).

The rogue ONU detection and recovery apparatus controls the OLT so that the OLT transmits the Assign ONU-ID PLOAM message and the Assign EqD PLOAM message to the second ONU. The first ONU that has received the message transmitted from the OLT is immediately switched from the initial mode to the operation mode (S452).

The operation mode switching of the first ONU and the second ONU may be sequentially performed, but the present disclosure is not limited thereto, and the rogue ONU detection and recovery apparatus may simultaneously perform the operation mode switching of the first ONU and the second ONU.

Figure 5:
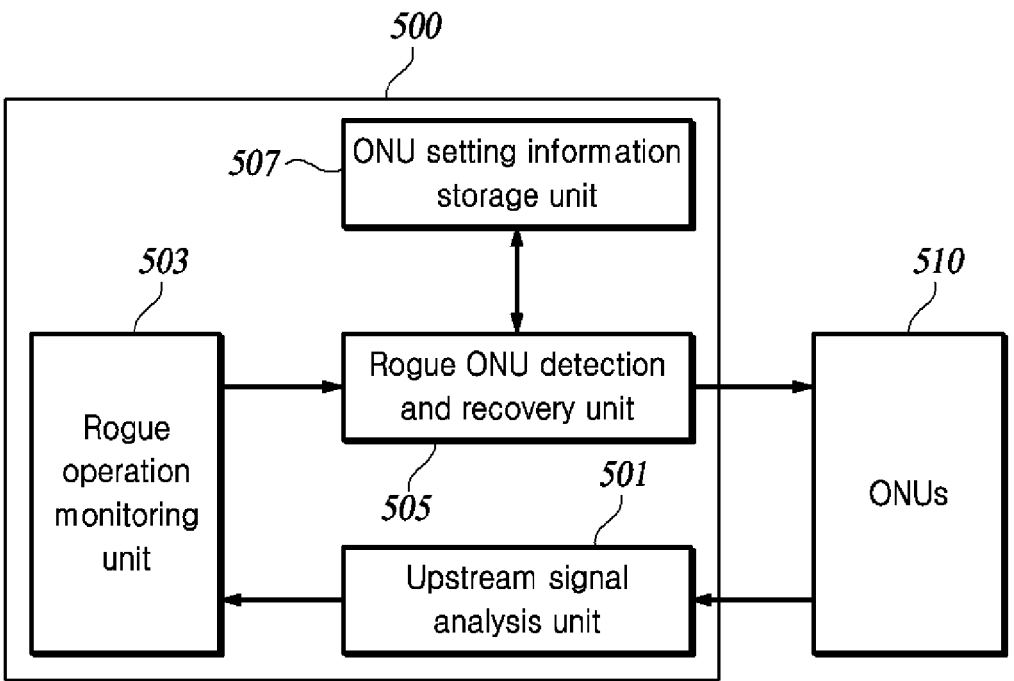
FIG. 5 is a diagram illustrating a process of detecting and recovering a rogue ONU operation in the rogue ONU detection and recovery apparatus according to the embodiment of the present disclosure.

FIG. 5 is a diagram illustrating a process of detecting and recovering a rogue ONU operation in the rogue ONU detection and recovery apparatus according to the embodiment of the present disclosure.

Referring to FIG. 5, a rogue ONU detection and recovery apparatus 500 includes an upstream signal analysis unit 501, a rogue operation monitoring unit 503, a rogue ONU detection and recovery unit 505, and an ONU setting information storage unit 507. The rogue ONU detection and recovery apparatus 500 senses a rogue ONU operation on the basis of upstream signals transmitted from a plurality of ONUs 510, and transmits a control message for rogue ONU recovery to the plurality of ONUs 510.

The upstream signal analysis unit 501 analyzes the upstream signals transmitted from the plurality of ONUs 510, acquires the LOS signal and the number of FEC uncorrectable errors for each ONU detected by a PON reception unit, and transmits the LOS signal and the number of FEC uncorrectable errors to the rogue operation monitoring unit 503.

The rogue operation monitoring unit 503 senses the rogue operation of the PON network on the basis of the received LOS signal and information on the number of FEC uncorrectable errors. Specifically, the rogue operation monitoring unit 503 determines that the operation of the rogue ONU has occurred when the LOS signals for all the ONUs are detected and the number of FEC uncorrectable errors shows a rapidly increasing trend. When the rogue operation monitoring unit 503 determines that the operation of the rogue ONU has occurred, the rogue operation monitoring unit 503 transmits a command to start a rogue ONU detection and recovery process to the rogue ONU detection and recovery unit 505.

The rogue ONU detection and recovery unit 505 performs the rogue ONU detection and recovery process in a unicast or broadcast manner. In the unicasting manner, the rogue ONU detection and recovery unit 505 sequentially transmits the Deactivate ONU PLOAM message to each ONU. When the ONU is not a rogue ONU, the rogue ONU detection and recovery unit 505 generates and transmits an Assign ONU-ID PLOAM message and an Assign EqD PLOAM message using the ONU-ID, serial number, and distance correction value (EqD) stored in the ONU setting information storage unit 507 in advance.

In the broadcasting manner, the Deactivate ONU PLOAM message is transmitted to all the ONUs. When the rogue operation is released in a state in which all the ONUs have been deactivated, the rogue ONU detection and recovery unit 505 generates and transmits the Assign ONUID PLOAM message and the Assign EqD PLOAM message to all the ONU using the ONUID, serial number, and distance correction value (EqD) stored in the ONU setting information storage unit 507 in advance.

The ONU setting information storage unit 507 stores ONU-ID data, serial number (VSSN) data, and distance correction value (EqD) data for the plurality of ONUs. The ONU setting information storage unit 507 provides data stored in a process of recovering the ONU to the operation mode to the rogue ONU detection and recovery unit 505.

The ONU-ID data, the serial number (VSSN) data, and the distance correction value (EqD) data for the ONU stored in the ONU setting information storage unit 507 may be updated on the basis of a result of detection and recovery of the rogue ONU. For example, the rogue ONU detection and recovery unit 505 performing the activation process on the rogue ONU again to reset various setting parameters. Here, the ONU-ID and the distance correction value (EqD) for the rogue ONU may be reset to new values, and the ONU setting information storage unit 507 may update the ONU-ID and the distance correction value stored for the ONU in advance with a new ONU-ID and distance correction value (EqD).

Figure 6:
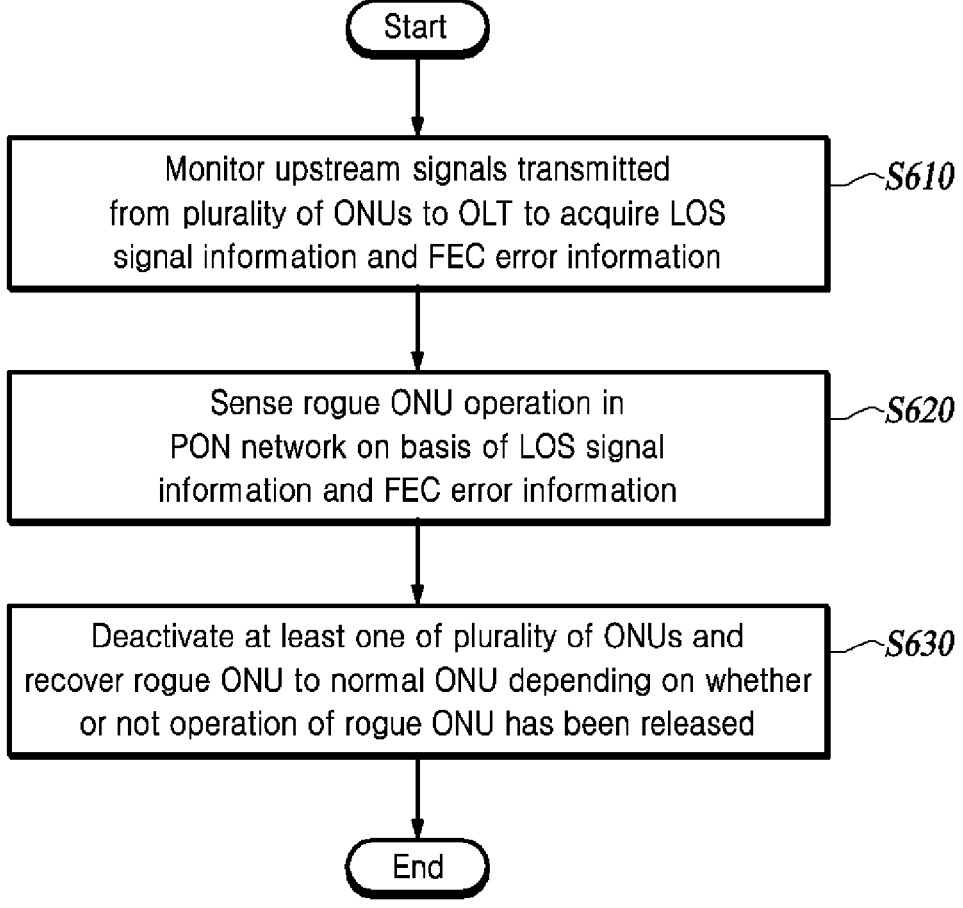
FIG. 6 is a flowchart illustrating a rogue ONU detection and recovery method according to an embodiment of the present disclosure.

FIG. 6 is a flowchart illustrating a rogue ONU detection and recovery method according to an embodiment of the present disclosure.

Referring to FIG. 6, the rogue ONU detection and recovery apparatus monitors the upstream signals transmitted from the plurality of ONUs to the OLT to acquire the LOS signal information and the FEC error information (S610).

The LOS signal information is an LOS signal for at least any one of the plurality of ONUs detected from the upstream signal. The upstream signal may include a plurality of burst signal frames corresponding to the plurality of ONUs, and when a signal for a pre-allocated time slot in the plurality of burst signal frames is not received, an LOS signal for warning this is generated. The LOS signal information may include information on whether or not an LOS signal for all the ONUs connected to the OLT is generated.

The FEC error information is the information on the number of FEC uncorrectable errors generated in the upstream signal. Specifically, the FEC error information is information on the number of errors that cannot be corrected even by using the FEC algorithm among errors generated in the data of the upstream signal.

When the FEC is performed on the data of the upstream signal, information on at least one of the number of errors generated in the data, the number of errors corrected using the FEC, and the number of FEC uncorrectable errors may be acquired.

The FEC error information includes the information on the number of FEC uncorrectable errors. For example, the FEC error information may include information on the number of errors of the FEC uncorrectable error counter.

The rogue ONU detection and recovery apparatus detects the rogue ONU operation in the PON network on the basis of the LOS signal information and the FEC error information (S620).

When the LOS signals for all the ONUs are generated and the number of FEC errors increases, any cause of distortion in the transmitted optical signals of all the temporally and spatially isolated ONUs can be evaluated as being continuously present throughout an entire section of the upstream signal in the PON network. Further, such a cause may be expected to be any signal or noise causing significant distortion in the upstream signal, from a sudden increase in the FEC uncorrectable error.

The rogue ONU detection and recovery apparatus determines whether or not LOS signals are generated for all the ONUs in the PON network on the basis of the LOS signal information. When any one ONU is a rogue ONU in the PON network, an abnormal continuous optical signal transmitted from the rogue ONU collides with burst signals of all the other ONUs. In this case, the LOS signal may be generated for each of all the ONUs. The rogue ONU detection and recovery apparatus may determine whether or not signals for all the ONUs connected to the OLT are abnormally received, on the basis of the LOS signal information.

The rogue ONU detection and recovery apparatus determines whether or not the number of FEC uncorrectable errors generated for the upstream signal increases on the basis of the FEC error information.

When the abnormal continuous optical signal transmitted from the rogue ONU collides with the burst signals of all the other ONUs, an FEC error for the upstream signal increases. In particular, since the signal distortion generated while the burst signal overlapping with the continuous optical signal causes serious errors that cannot be corrected by the FEC algorithm, the number of FEC uncorrectable errors increases suddenly.

The rogue ONU detection and recovery apparatus determines that the operation of the rogue ONU has occurred in the PON network when the LOS signals for all the ONUs among the plurality of ONUs are generated and the number of FEC uncorrectable errors increases. Here, the rogue ONU detection and recovery apparatus may determine that the operation of the rogue ONU has occurred when the number of FEC uncorrectable errors increases to the preset threshold value or more. For example, the rogue ONU detection and recovery apparatus may be implemented to compare a bit error rate (BER) of an upstream signal with a preset threshold value to determine whether or not an operation of the rogue ONU has occurred.

The rogue ONU detection and recovery apparatus deactivates at least one of the plurality of ONUs and recovers the rogue ONU to a normal ONU depending on whether or not the operation of the rogue ONU has been released (S630).

According to an embodiment, the rogue ONU detection and recovery apparatus may sequentially perform detection and recovery of the rogue ONU on the plurality of ONUs in a unicast manner.

The rogue ONU detection and recovery apparatus deactivates any one of the plurality of ONUs. The rogue ONU detection and recovery apparatus transmits a deactivation PLOAM message to any one of the plurality of ONUs connected to the OLT, that is, the ONU under test. The ONU under test that has received the deactivation PLOAM message is switched from the operation mode to the initial mode.

The rogue ONU detection and recovery apparatus checks whether or not the operation of the rogue ONU is released on the basis of the LOS signal information and the FEC error information in a state in which the ONU under test is deactivated.

When the ONU under test is a rogue ONU, collision with the burst signals of the other ONUs does not occur because the deactivated ONU under test no longer transmits the continuous optical signal. Accordingly, the LOS signal for the ONUs other than the ONU under test is not generated, or the LOS signal is generated only for some of the ONUs. Further, the number of FEC uncorrectable errors no longer increases suddenly. On the other hand, when the ONU under test is not the rogue ONU, any one ONU other than the ONU under test still transmits the continuous optical signal, and thus, the collisions with the burst signals of the other ONUs continue. Therefore, the LOS signal is generated for all the ONUs other than the ONU under test, and the number of FEC uncorrectable errors also increases suddenly.

The rogue ONU detection and recovery apparatus monitors the upstream signal transmitted to the OLT for a preset time, determines that the operation of the rogue ONU is still not released when the LOS signal is generated for all the ONUs other than the ONU under test among the plurality of ONUs and the number of FEC uncorrectable errors continues to increase, and determines that the operation of the rogue ONU has been released in other cases.

When the operation of the rogue ONU is not released, the rogue ONU detection and recovery apparatus determines the deactivated ONU under test to be a normal ONU, and switches the ONU under test from the initial mode to the operation mode using the pre-stored ONU setting information. Here, the pre-stored ONU setting information may include at least one of the ONU identification information, the burst signal allocation information, and the ONU distance correction value information for the ONU under test, which are stored in advance before inactivation.

The rogue ONU detection and recovery apparatus generates and transmits a PLOAM message that performs control so that the ONU under test is switched to an operation mode using the pre-stored ONU setting information. Here, the PLOAM message may include an Assign ONU-ID PLOAM message and an Assign EqD PLOAM message. The test target ONU that has received the PLOAM message is immediately switched to the operation mode before the deactivation without a normal activation process such as identifier assignment or distance measurement.

The rogue ONU detection and recovery apparatus determines any ONU other than the ONU under test among the plurality of ONUs connected to the OLT to be a new ONU under test, and performs the same process as the above-described processes of deactivating and checking whether or not the operation of the rogue ONU has been released. The rogue ONU detection and recovery apparatus may sequentially repeat the same process for each of the plurality of ONUs connected to the OLT until the operation of the rogue ONU is released.

When the operation of the rogue ONU is released, the rogue ONU detection and recovery apparatus determines the ONU under test to be the rogue ONU and performs the activation process on the ONU under test again. Here, the activation process may include a normal process of resetting various setting parameters for the ONU under test determined to be the rogue ONU to transmit an upstream signal to the OLT.

According to another embodiment, the rogue ONU detection and recovery apparatus may perform detection and recovery of the rogue ONU on the plurality of ONUs in a broadcasting manner.

The rogue ONU detection and recovery apparatus deactivates all of the plurality of ONUs. The rogue ONU detection and recovery apparatus transmits a deactivation PLOAM message to all of the plurality of ONUs connected to the OLT. The plurality of ONUs that has received the deactivation PLOAM message are all switched from the operation mode to the initial mode.

The rogue ONU detection and recovery apparatus checks whether or not the operation of the rogue ONU is released on the basis of the LOS signal information and the FEC error information in a state in which all the ONUs have been deactivated. When not only the normal ONU that has received the deactivation PLOAM message but also the rogue ONU are controlled by the deactivation PLOAM message, any optical signal as well as the continuous optical signal is not transmitted. Therefore, the number of FEC uncorrectable errors no longer increases.

The rogue ONU detection and recovery apparatus monitors an upstream signal detected by a reception unit of the OLT for a preset time and determines whether or not the operation of the rogue ONU has been released on the basis of the detected LOS signals and whether or not the number of FEC uncorrectable errors increases.

When the operation of the rogue ONU is released, the rogue ONU detection and recovery apparatus sequentially switches the plurality of ONUs to the operation mode using the pre-stored ONU setting information. Here, the pre-stored ONU setting information may include at least one of the ONU identification information, the burst signal allocation information, and the ONU distance correction value information for each of the plurality of ONUs stored in advance before deactivation.

The rogue ONU detection and recovery apparatus generates and transmits a PLOAM message for performing control so that each of the plurality of ONUs is switched from the initial mode to the operation mode using the pre-stored ONU setting information. Here, the PLOAM message may include an Assign ONU-ID PLOAM message and an Assign EqD PLOAM message. The plurality of ONUs that have received the PLOAM message are sequentially switched to the operation mode before deactivation without a normal activation process such as identifier assignment or distance measurement.

At least some of the components described in the exemplary embodiments of the present disclosure may be implemented as hardware elements including at least one of a digital signal processor (DSP), a processor, a controller, an application-specific IC (ASIC), a programmable logic device (FPGA or the like), and other electronic devices, or a combination thereof. Further, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The methods according to exemplary embodiments of the present disclosure may be created as a computer-executable program, and may be implemented in various recording media such as a magnetic storage medium, an optically readable medium, and a digital storage medium.

Implementations of the various technologies described herein may be implemented in digital electronic circuitry, or in computer hardware, firmware, software, or a combination thereof. The implementations may be made as a computer program tangibly embodied in a computer program product, that is, an information carrier such as a machine-readable storage device (computer-readable medium) or a radio wave signal, for processing according to an operation of a data processing apparatus such as a programmable processor, computer, or plurality of computers, or for controlling of the operation. A computer program such as the computer program(s) described above may be recorded in any form of programming language, including a compiled or interpreted language, and may be deployed in any form as a stand-alone program or as another unit suitable for the use in a module, component, subroutine, or computing environment. A computer program can be deployed to be processed on one computer or a plurality of computers at one site or to be distributed across a plurality of sites and interconnected by a communication network.

Processors suitable for processing of the computer program include, for example, both general and special purpose microprocessors, and any one or more processors of any type of digital computer. Generally, a processor will receive instructions and data from a read only memory, a random access memory, or both. Elements of a computer may include at least one processor that executes instructions, and one or more memory devices that store instructions and data. In general, a computer may include one or more mass storage devices that store data, such as magnetic disks, magneto-optical disks, or optical disks, or may also be connected to receive data from, send data to, or both. Information carriers suitable for embodying computer program instructions and data include, for example, semiconductor memory devices, such as magnetic media such as a hard disk, a floppy disk, and a magnetic tape, an optical media such as a compact disk read only memory (CD-ROM) and a digital video disk (DVD), magneto-optical media such as a Floptical Disk, a read only memory (ROM), a random access memory (RAM), a flash memory, an erasable programmable ROM (EPROM), an electrically erasable programmable ROM (EEPROM), and the like. The processor and the memory may be supplemented by or included in an application specific integrated circuit.

The processor may perform an operating system and a software application that is performed on the operating system. Further, a processor device may access, store, manipulate, process, and generate data in response to execution of software. Although there are cases in which one processor device is used for convenience of understanding, those skilled in the art will understand that the processor device may include a plurality of processing elements and/or a plurality of types of processing elements. For example, the processor device may include a plurality of processors or one processor and one controller. Other processing configurations such as a parallel processor are also possible.

Further, non-transitory computer-readable media may be any usable media that can be accessed by a computer, and may include all of computer storage media and transmission media.

Although the present specification includes many specific implementation details, these should not be understood as being limiting on the scope of any invention or what is claimed, but should be rather understood as description of characteristics that may be unique to a specific embodiment of a specific invention. Specific characteristics described in the present specification in the context of individual embodiments may also be implemented in combination in a single embodiment. On the other hand, various characteristics described in the context of a single embodiment can also be implemented in a plurality of embodiments individually or in any suitable sub-combination. Further, although characteristics may be operated in specific combinations and are initially depicted as claimed, one or more characteristics from a claimed combination may be excluded from the combination in some cases, and the claimed combination may be changed to a sub-combination or a modification of sub-combination.

Similarly, although operations are depicted in the drawings in a particular order, such operations or all shown operations should not be understood as being performed in the specific shown order or a sequential order to obtain preferable results. In a specific case, multitasking and parallel processing can be advantageous. Further, the separation of various device components in the above-described embodiment should not be understood as being required in all embodiments, and it should be understood that the program components and devices described may generally be integrated together into a single software product or packaged into multiple software products.

What is claimed is:

1. A rogue optical network unit (ONU) detection and recovery method in a passive optical network (PON) network, the method comprising steps of:

monitoring upstream signals transmitted from a plurality of ONUs to an optical line terminal (OLT) to acquire loss-of-signal (LOS) signal information and forward error correction (FEC) error information;

sensing an operation of the rogue ONU in the PON network on the basis of the LOS signal information and the FEC error information, wherein the step of sensing the operation of the rogue ONU includes:

determining whether or not LOS signals have been generated for all of the plurality of ONUs on the basis of the LOS signal information;

determining whether or not a number of FEC uncorrectable errors generated for the upstream signal increases on the basis of the FEC error information; and determining that the operation of the rogue ONU has occurred in the PON network when the LOS signals are generated for all of the plurality of ONUs and the number of FEC uncorrectable errors increases; and deactivating at least one of the plurality of ONUs and recovering the rogue ONU to a normal ONU according to whether or not the operation of the rogue ONU is released.

2. The rogue ONU detection and recovery method of claim 1, wherein the LOS signal information includes an LOS signal for the at least one of the plurality of ONUs detected in the upstream signal.

3. The rogue ONU detection and recovery method of claim 1, wherein the FEC error information is information on the number of FEC uncorrectable errors generated for the upstream signal.

4. The rogue ONU detection and recovery method of claim 1, wherein the step of deactivating at least one of the plurality of ONUs and recovering the rogue ONU to a normal ONU includes steps of:

deactivating any one of the plurality of ONUs (an ONU under test);

checking whether or not the operation of the rogue ONU is released on the basis of the LOS signal information and the FEC error information; and determining the ONU under test to be a normal ONU and switching the ONU under test to an operation mode using pre-stored ONU setting information when the operation of the rogue ONU is not released.

5. The rogue ONU detection and recovery method of claim 4, wherein the step of deactivating at least one of the plurality of ONUs and recovering the rogue ONU to a normal ONU includes a step of determining that the ONU under test is a rogue ONU, and performing an activation process for the ONU under test again when the operation of the rogue ONU is released.

6. The rogue ONU detection and recovery method of claim 1, wherein the step of deactivating at least one of the plurality of ONUs and recovering the rogue ONU to a normal ONU includes steps of:

deactivating the plurality of ONUs;

checking whether or not the operation of the rogue ONU is released on the basis of the LOS signal information and the FEC error information; and sequentially switching the plurality of ONUs to an operation mode using the pre-stored ONU setting information when the operation of the rogue ONU is released.

7. A computer-readable recording medium having a computer program stored therein, wherein the computer program includes instructions for causing a processor to perform the method according to claim 1.

8. A rogue optical network unit (ONU) detection and recovery apparatus comprising:

a memory configured to store one or more instructions; and a processor configured to execute the one or more instructions stored in the memory;

US 12,615,460 B2

19 wherein the processor executes the one or more instructions to monitor an upstream signals transmitted from a plurality of ONUs to an optical line terminal (OLT) to acquire loss-of-signal (LOS) signal information and forward error correction (FEC) error information;

sense an operation of a rogue ONU in a passive optical network (PON) network on the basis of the LOS signal information and the FEC error information by:

determining whether or not LOS signals have been generated for all of the plurality of ONUs on the basis of the LOS signal information;

determining whether or not a number of FEC uncorrectable errors generated for the upstream signal increases on the basis of the FEC error information; and determining that the operation of the rogue ONU has occurred in the PON network when the LOS signals are generated for all of the plurality of ONUs and the number of FEC uncorrectable errors increases; and deactivate at least one of the plurality of ONUs and recover the rogue ONU to a normal ONU.

9. The rogue ONU detection and recovery apparatus of claim 8, wherein the LOS signal information includes an LOS signal for the at least one of the plurality of ONUs detected in the upstream signal.

10. The rogue ONU detection and recovery apparatus of claim 8, wherein the FEC error information is information on the number of FEC uncorrectable errors generated for the upstream signal.

11. The rogue ONU detection and recovery apparatus of claim 8, wherein the processor deactivates any one of the plurality of ONUs (an ONU under test);

checks whether or not the operation of the rogue ONU is released on the basis of the LOS signal information and the FEC error information; and determines the ONU under test to be a normal ONU and switching the ONU under test to an operation mode using pre-stored ONU setting information when the operation of the rogue ONU is not released.

12. The rogue ONU detection and recovery apparatus of claim 11, wherein the processor determines that the ONU under test is a rogue ONU and performs an activation process for the ONU under test again when the operation of the rogue ONU is released.

13. The rogue ONU detection and recovery apparatus of claim 8, wherein the processor deactivates the plurality of ONUs;

checks whether or not the operation of the rogue ONU is released on the basis of the LOS signal information and the FEC error information; and sequentially switches the plurality of ONUs to an operation mode using pre-stored ONU setting information when the operation of the rogue ONU is released.

* * * * *